United States Patent [19]

Lee

[11] Patent Number: 4,695,496
[45] Date of Patent: Sep. 22, 1987

[54] SKIN PROTECTIVE PAD

[76] Inventor: William Lee, Star Rte. #1, Box 542, Cave Creek, Ariz. 85331

[21] Appl. No.: 885,486

[22] Filed: Jul. 14, 1986

[51] Int. Cl.⁴ .......................... B32B 3/02; B32B 5/18; B32B 5/32
[52] U.S. Cl. .......................................... 428/95; 5/448; 5/472; 5/473; 5/481; 54/65; 54/66; 54/79; 428/286; 428/311.5; 428/316.6
[58] Field of Search ................ 428/91, 95, 286, 311.5, 428/316.6; 54/65, 66, 79; 5/448, 472, 473, 481

[56] References Cited

U.S. PATENT DOCUMENTS 4,350,726 9/1982 Berry ................................. 428/316.6

Primary Examiner—Marion C. McCamish
Attorney, Agent, or Firm—LaValle D. Ptak

[57] ABSTRACT

A multi-layer skin protective pad which is suitable for use as a saddle pad, a mattress pad, and other uses, comprises four layers of material. A first layer is adapted for placement against the body of a horse (for a saddle pad) or the body of a person (for a mattress pad) and is made of a plurality of elongated hydrophobic fibers which wick moisture and perspiration away from the body. A water storage and energy dissipation cushion layer made of foam material is attacthed to the first layer through a hydrophobic membrane layer which has pore sizes to permit passage of water vapor from the first layer to the cushion layer, and which blocks the passage of water droplets in the opposite direction from the cushion layer to the first layer. The opposite side of the cushion layer is covered with a water impervious protective layer, typically made of vinyl material.

18 Claims, 5 Drawing Figures

SKIN PROTECTIVE PAD

BACKGROUND

Skin protective pads are used for a variety of different applications. Prevalent among these applications are pads for use under saddles to provide a cushion between the saddle and the horse and to prevent or minimize chafing and saddle sores. This is accomplished by making the pad out of a material which absorbs the perspiration from the back of the horse and, at the same time, provides sufficient thickness to cushion the horse from the effects of the movement of the saddle. The cushioning effect also is desirable to increase the comfort to both the rider and the horse by dampening the shock effects produced by opposing motion between the rider in the saddle and the movement of the horse.

Saddle pads also ideally are made of a material which does not irritate the horse and also typically are constructed to provide as much ventilation or air passage as possible to allow normal perspiration and to permit access of cooling air to the hide or skin of the horse beneath the saddle.

In its simplest form, a very effective saddle pad is a piece of sheep skin which is placed on the back of the horse with the wool side facing the horse and the skin side located directly underneath the saddle. Sheep skin pads, however, do not entirely isolate the saddle from the moisture or perspiration; so that the underside of the saddle may become damp and thereby is subject to damage caused by such dampness. Sheep skin also is relatively expensive and tends to matt as a result of the large amounts of moisture and pressure applied to it over a period of time of use.

Simple wool blankets also are widely used as saddle pads. Wool pads, however, are subject to many of the disadvantages of sheep skin and in fact do not provide as good air circulation as is achieved with sheep skin pads. Wool saddle blankets or pads also are not especially effective at preventing saddle sores or chafing, particularly for horses which are ridden over relatively long periods of time in strenuous workouts.

Four saddle pads which are directed to overcoming the disadvantages of sheep skin and wool saddle pads mentioned above, and in which an attempt is made to maximize the comfort to both horse and rider while providing removal of perspiration from the back of the horse, are disclosed in the patents to McClain U.S. Pat. No. 604,567; Tauber U.S. Pat. No. 2,072,188; Stoner U.S. Pat. No. 3,466,852; and Deal U.S. Pat. No. 3,807,136. The McClain patent discloses a harness pad or saddle pad having a smooth outer layer of material which is placed against the hide of the horse. A similar type of material is placed on the side adjacent the saddle. Between these two layers, the inside of the pad is separated into two parts by a waterproof diaphragm. The chamber or area which is on the horse side of the pad is filled with an absorbent filling, such as sponge, to hold perspiration passing into this chamber through the outer layer from the back of the horse. The chamber on the upper side beneath the saddle is filled with a relatively inexpensive pad material. Water storage and energy dissipation takes place by means of the sponge in the water absorption chamber. Because a smooth material is placed against the hide of the horse, however, chafing and saddle sores may result; and there is nothing to prevent the passage of moisture from the storage sponge chamber back through the outer layer to the back of the horse.

The patent to Tauber is simply a foam rubber or a sponge rubber pad which has a sheet rubber backing on the saddle side to prevent moisture from going through the pad onto the saddle. The pad itself is intended to soak up moisture from the back of the horse, and a number of ventilating openings are provided through the pad. Movement of the saddle relative to the horse is intended to create a pumping action on the pad to insure a constant circulation of air through the pad in and out of the ventilating openings. Foam rubber, however, is relatively hot. Consequently, increased perspiration under the saddle when a pad of this type is used is likely to occur. Even though there are ventilation openings provided in the foam rubber, the overall effect is such that the air movement or breathing action is not as good as is obtained with natural sheep skin pads.

The Stoner patent is directed to a disposable horse blanket having outer and inner water absorbent paper layers separated by a plastic water barrier layer. This protects the underside of the saddle from the perspiration of the horse. The pad itself, however, is relatively thin and is not particularly effective in removing moisture from the back of the horse, nor is the horse blanket of Stoner very effective in providing air circulation over the back of the horse under the saddle.

The Deal patent is directed to a saddle pad which is made of a synthetic pile fabric extending from a thin plastic backing material. The pad then is folded over on itself to provide a layer of the synthetic pile fabric on the side which contacts the saddle as well as the side which is placed against the back of the horse. Some versions of the pad of this patent employ a foam rubber center between the upper and lower plastic backing layers. The plastic backing layer is water impervious, so that no moisture absorption takes place in the foam center. As a result, since the pile fiber is also non-moisture absorptive, the only water removal is effected by air circulation between the pad and the hide of the horse through the pile fiber.

Multiple layer protective pads also are used fairly extensively for long term bed-ridden patients or invalids in hospitals and nursing homes. In addition, multiple layer pads are provided for backpackers, wheelchair seats, and the like. The purpose in all of these is to provide a cushioning effect, to minimize chafing and pressure points (which produce bed sores in bed-ridden patients) and to remove moisture away from the skin of the patient or user of the pad. A pad of this general type used for backpackers is disclosed in the patent to Berry U.S. Pat. No. 4,350,726. This pad is a two-part pad constructed of a foam layer bonded to a synthetic wool fleece. The synthetic wool side of the pad is placed against the skin of the wearer to provide a surface which moves with the skin. This layer also permits some air circulation to assist in carrying away perspiration. The foam layer functions as a shock absorbing cushion between the backpack and the wearer. As is readily apparent, the structure of this pad is similar to some of the saddle pad structures discussed above.

A different multiple layer pad for a very different purpose is disclosed in the patent to Bailly U.S. Pat. No. 4,461,099. The pad of this patent is a three layer laminate for use in shoes. The bottom layer, located farthest away from the skin of the user, comprises a sheet of closed cell foam thermal-plastic. Then a middle layer of odor absorbing material is placed between the bottom layer and a top layer. This top layer is made of non-woven, hyrophobic fiber which is intended to wick perspiration away from the foot of the user. This moisture then is passed through the odor absorbing layer into the lowermost foam layer. In addition to providing a water storage function, the foam layer also provides a cushioning or shock absorbing function. Once the foam layer is saturated, however, there is nothing to prevent moisture from passing back up through the foam layer to the foot of the wearer. Since this pad is intended to be worn inside a shoe, the moisture absorbing capacity of the pad is significantly limited due to the necessity of making the entire laminate relatively thin, otherwise the user would not be able to use the pad at all or considerable discomfort could be encountered if more than a minimal amount of space in the shoe were to be taken up by the pad.

A pad which is similar to the one disclosed in Berry, but which is used for bed covering, is disclosed in the patent to Hughes U.S. Pat. No. 3,635,785. A non-woven fabric layer is bonded to a foam layer. The manner in which the different layers function is essentially the same as the pad of Berry.

Bed pads in nursing homes and for long term hospital patients also are in relatively widespread use in which a water impervious lower layer or sheet is placed in contact with the mattress. Over this sheet a moisture absorbing layer, frequently comprised of fibrous material, is placed. On the top of the moisture absorbing layer a foam pad then is provided. Moisture from the patient passes through the foam pad into the moisture absorbing layer where it is held. The moisture impervious layer located on top of the mattress prevents moisture from damaging the mattress. No wicking action is necessary here since moisture simply flows downwardly from the patient through the foam layer to the lowest point in the pad, which is immediately on top of the water impervious sheet covering the mattress. In most pads of this general type, there is nothing to prevent moisture from passing back up to skin of the patient, especially after saturation of the moisture holding layer occurs.

To overcome some of the disadvantages of the bed pads mentioned above, a construction to minimize the reverse passage of water is disclosed in the patent to Gallagher U.S. Pat. No. 4,173,046. This patent sandwiches a water impervious sheet between the moisture absorbing layer and an upper closed cell foam pad. This sandwiched sheet has holes or apertures through it at spaced intervals to permit fluid flowing through the foam pad to pass through the holes into the moisture absorbing layer. The intent of this patent is to minimize unpleasant odors which otherwise would emanate from the moisture absorbing layer. The perforated sheet does not constitute a one-way membrane, but it does function to restrict somewhat the flow of water or other fluids from the moisture layer back up into the upper foam layer.

It is desirable to provide a pad which may be used either as a saddle pad, a bed pad, a wheelchair pad, or the like which protects the skin of the horse or human user from irritation, which removes perspiration effectively, which cools the hide of the horse or skin of the patient, and which cushions the hide or skin during use, while at the same time overcoming the disadvantages of the prior art mentioned above.

SUMMARY OF THE INVENTION

Accordingly it is an object of this invention to provide an improved skin protective pad.

It is another object of this invention to provide an improved skin protective pad for removing perspiration and cushioning the skin of the animal or person using the pad.

It is an additional object of this invention to provide an improved skin protective pad having improved perspiration removal and storage capabilities, good shock absorbency, and improved cooling.

It is a further object of this invention to provide a skin protective pad capable of producing an improved temperature and humidity microclimate and microcirculation at the skin of a horse or person to minimize temperature and humidity over the portion of the hide or skin covered by the pad.

In accordance with a preferred embodiment of this invention, a skin protective pad includes a first layer (for placement against the skin of a person or the hide of a horse or other animal) comprised of a plurality of hydrophobic fibers to wick moisture and perspiration away from the hide or skin. A water storage and energy dissipation cushion layer is interconnected with the hydrophobic fiber layer by an intermediate membrane layer. The membrane layer has open pores or passages through it of a size which permit passage of water vapor and perspiration only from the fiber layer to the cushion layer, but which block the passage of water droplets in the opposite direction from the cushion layer to the fiber layer; because vapor molecules are much smaller than water molecules.

In some applications, a water impervious top layer is placed over the water storage and energy dissipation cushion layer.

DETAILED DESCRIPTION

Figure 1:
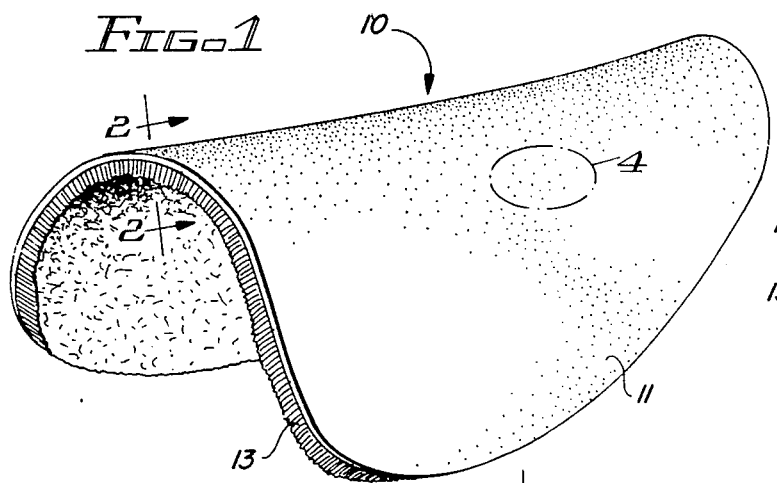
FIG. 1 is a perspective view of a preferred embodiment of the invention.

Reference now should be made to the drawing in which the same or similar reference numbers are used throughout the different figures to designate the same components.

Figure 4:
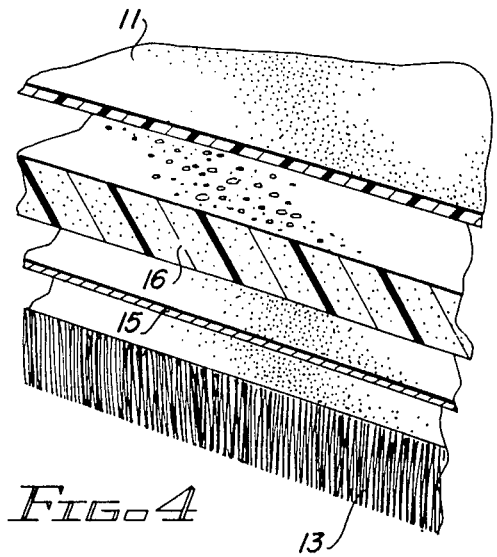
FIG. 4 is a partially cut-away exploded view of the embodiment shown in FIG. 1, taken from the area encircled on FIG. 1.

FIG. 1 is a perspective view of a saddle pad made in accordance with a preferred embodiment of the invention. The saddle pad includes a water and air impervious top layer 11, which typically is made of vinyl or similar material. This top layer is placed against the underside of a saddle when the pad of FIG. 1 is in use. The lowermost layer 13, which is placed against the hide or skin of a horse 20, is made of "synthetic sheep skin" consisting of a cut pile construction of elongated hydrophobic fibers. A variety of different materials may be used; and polyeter fibers, such as Kodel ® have been found to be quite effective. These fibers then are attached to a membrane layer 15 which in turn is attached to a foam cushion layer 16, top of which is bonded to and covered by the vinyl outer layer 11. This structure is shown most clearly in FIGS. 2 and 4.

Figure 2:
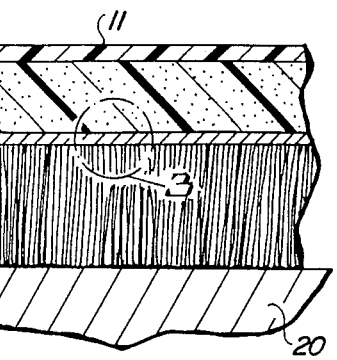
FIG. 2 is a cross-sectional view taken along the line 2—2 of FIG. 1.
Figure 3:
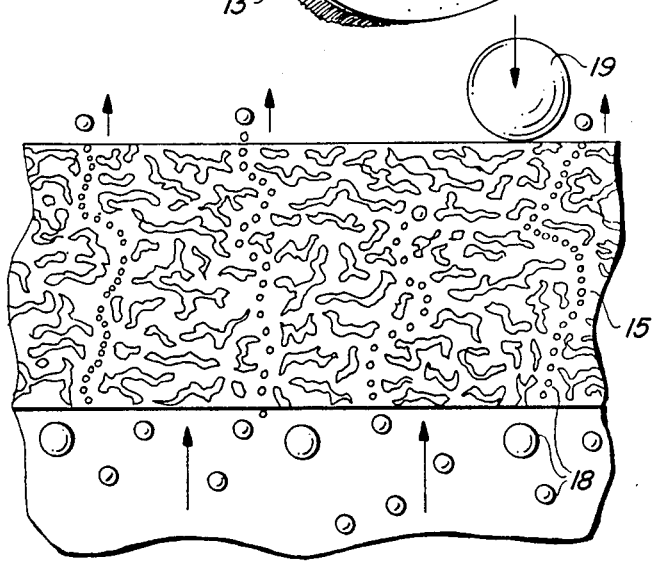
FIG. 3 is an enlargement of a portion of the cross-sectional view shown in FIG. 2 to illustrate details of a feature of the preferred embodiment.

As illustrated most clearly in FIG. 3, the membrane layer 15 is made of an open pore hydrophobic material such as GORE-TEX ® membrane. The pore size of the membrane layer 15 is significantly larger than individual molecules of water vapor produced by perspiration but less than the size of water droplets. The hydrophobic fibers 13, when the pad is in use on a horse, tend to draw perspiration moisture upward off of the back of the horse by a wicking action. This perspiration is indicated by the water vapor droplets 18 in FIG. 3. The heat of the skin beneath the pad tends to drive this perspiration upwardly through the pores of the membrane 15, as illustrated diagrammatically in FIG. 3, to exit at the upper side of the membrane 15. At the same time, the polyester fibers 13 provide substantial resiliency to hold the layer 15 up off of the back of the horse, as shown in FIG. 2, and permit movement of air through the spaces between adjacent ones of the fibers 13. This produces an improved "microclimate" to facilitate removal of the perspiration vapor and lower the temperature.

The perspiration vapor which exits from the top of the membrane layer 15 enters into the open pore structure of the foam layer 16 where the water vapor agglomerates into larger water droplets 19. These droplets are stored in the foam layer 16. Because of their large size (substantially larger than the pore sizes in the membrane 15), the droplets cannot pass downwardly through the membrane 15 back into the hydrophobic fiber layer 13.

The foam cushion layer 16 preferably is made of ETHIFOAM ® polyethylene foam and performs a number of different functions in the use of the saddle pad 10 of FIG. 1. One of these functions, mentioned above, is the storage of water which passes upwardly through the membrane layer 15 into the foam layer 16. The withdrawal of water from the fiber layer 13 is facilitated by a pumping or dash pot action produced during use of the pad, as the layer 16 is compressed and expanded continuously during use. Since the vinyl layer 11 is air and water tight, it causes a pumping action when the expansion of the foam 16 occurs after it has been compressed. A vacuum is produced in the layer 16 during expansion which tends to draw vapor upwardly from the fiber layer 13 through the membrane 15. During a subsequent compression of the layer 16, however, water droplets 19 are too large to be passed back downward through the membrane layer 15, as explained earlier. As a consequence, the compression of the water within the various pores and cells of the cushion 16 produces a viscous dampening or dash pot action which improves the shock absorbing characteristics of the foam layer 16. This occurs as a result of the various forces taking place using the water which is wicked into the semi-rigid cells of the foam layer 16. The cell columns are oriented randomly, so that the pumping action which occurs naturally during the use of the saddle pad assists in the movement of air through the foam layer. Consequently exchange of heat between this air and the droplets of agglomerated warm perspiration produces a cooling effect. This assists in producing an improved "microclimate" throughout the entire pad, including the fiber layer 13, of reduced humidity and lowered temperatures.

Figure 5:
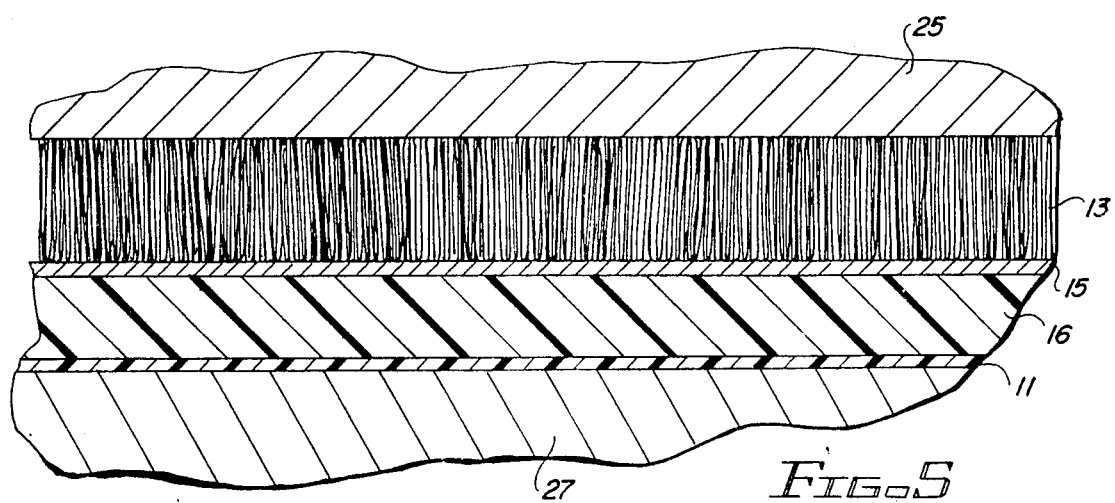
FIG. 5 is a cross-sectional view of an alternative embodiment of the invention.

An entirely different use, but one which employs the same principles of operation, is illustrated in FIG. 5. Here the pad is constructed in the same manner as the saddle pad of FIGS. 1 through 4. It is formed, however, in the shape of an elongated rectangular structure having the dimensions of the top of a mattress 27 on which it is placed. The pad, when used over the mattress of a bed is placed upside-down from the arrangement shown in FIG. 1; so that the vinyl or water and air impervious layer 11 is on the bottom in contact with the top of the mattress 27. The fibers 13 then point upwardly to support the body 25 of a patient or invalid resting on the bed with which the pad is used. In all other respects, the construction of the pad of FIG. 5 is the same as for the saddle pad described above in FIGS. 1 through 4; and the operation is the same as described above.

Typical thickness dimensions for the various layers of the pad, used either as a saddle pad or as a mattress pad, which have been found to be highly suitable are approximately 1" thick for the fiber layer 13, ½" thick for the foam cushion layer 16 and approximately ⅛" thick for the vinyl outer or covering layer 11. The membrane 15 is very thin, of the order of the thickness of a sheet of paper. Obviously, other thicknesses could be employed depending upon the particular requirements for the application with which a pad is used.

The above description and the embodiments shown in the drawing are to be considered illustrative only of the invention and not as limiting. Different shapes and relative dimensions, other than those mentioned above, may be used. Various types of materials also may be employed, provided the function of these materials is as described above in conjunction with the preferred embodiments. Other changes will occur to those skilled in the art without departing from the true scope of the invention.

What is claimed is:

1. A skin protection pad including in combination:
   a first layer comprised of a plurality of hydrophobic fibers for wicking moisture and perspiration away from skin;
   a water storage and energy dissipation cushion layer having first and second sides;
   a membrane layer interconnecting said first layer and the first side of said cushion layer, said membrane layer having pores through it of sizes constructed to permit passage of water vapor and perspiration from said first layer to said cushion layer and to block passage of water droplets from said cushion layer to said first layer; and
   a fourth water impervious layer connected to the second side of said cushion layer.

2. The combination according to claim 1 wherein said membrane layer is made of hydrophobic material.

3. The combination according to claim 2 wherein said plurality of hydrophobic fibers are elongated hydrophobic fibers.

4. The combination according to claim 3 wherein said first layer is made of polyester fiber.

5. The combination according to claim 4 wherein said fourth layer is a layer of vinyl material.

6. The combination according to claim 5 wherein said water storage and energy dissipation cushion layer comprises randomly oriented open cells which function in response to alternating compression and release of compression of said cushion layer to produce a vacuum action to draw vapor and perspiration from said first layer through said membrane layer and produce a viscous dampening of forces applied to said cushion layer upon compression thereof.

7. The combination according to claim 6 wherein the thickness of said first layer is selected to permit air circulation through said hydrophobic fibers when said pad is in use.

8. The combination according to claim 7 wherein said skin protective pad comprises a saddle pad, with said first layer being adapted for placement facing the body of a horse.

9. The combination according to claim 7 wherein said skin protective pad comprises a bed pad with said first layer being adapted for placement facing the body of a person on such bed.

10. The combination according to claim 1 wherein said first layer is adapted for placement against skin.

11. The combination according to claim 1 wherein said plurality of hydrophobic fibers are elongated hydrophobic fibers.

12. The combination according to claim 1 wherein said cushion layer is made of polyethylene foam.

13. The combination according to claim 1 wherein said fourth layer is a layer of vinyl material.

14. The combination according to claim 13 wherein said cushion layer is made of polyethylene foam.

15. The combination according to claim 13 wherein said water storage and energy dissipation cushion layer comprises randomly oriented open cells which function in response to alternating compression and release of compression of said cushion layer to produce a vacuum action to draw vapor and perspiration from said first layer through said membrane layer and produce a viscous dampening of forces applied to said cushion layer upon compression thereof.

16. The combination according to claim 1 wherein the thickness of said first layer is selected to permit air circulation through said hydrophobic fibers when said pad is in use.

17. The combination according to claim 1 wherein said skin protective pad comprises a saddle pad, with said first layer being adapted for placement facing the body of a horse.

18. The combination according to claim 1 wherein said skin protective pad comprises a bed pad with said first layer being adapted for placement facing the body of a person on such bed.

* * * * *